United States Patent [19]
Schmidt

[11] Patent Number: 5,979,181
[45] Date of Patent: Nov. 9, 1999

[54] METHOD FOR THE LIQUEFACTION OF A HYDROCARBON-RICH GAS STREAM CONTAINING AROMATIC AND HEAVY HYDROCARBONS

[75] Inventor: Hans Schmidt, Wolfratshausen, Germany

[73] Assignee: Linde Aktiengesellschaft, Wiesbaden, Germany

[21] Appl. No.: 08/869,755

[22] Filed: Jun. 5, 1997

[30] Foreign Application Priority Data

Jun. 5, 1996 [DE] Germany .............. 196 22 692

[51] Int. Cl.⁶ .................................. F25J 1/00
[52] U.S. Cl. .................. 62/635; 62/632; 62/912
[58] Field of Search .............. 62/632, 635, 912

[56] References Cited

U.S. PATENT DOCUMENTS 4,606,741  8/1986  Moreau et al. .............. 62/632
5,390,499  2/1995  Rhoades et al. .............. 62/632

*Primary Examiner*—Ronald Capossela
*Attorney, Agent, or Firm*—Millen, White, Zelano & Branigan, P.C.

[57] ABSTRACT

Method for the liquefaction of a hydrocarbon-rich gas stream containing aromatic and heavy hydrocarbons, in particular a natural gas stream, where, prior to the liquefaction, a separation of the aromatic and the heavy hydrocarbons, in particular the $C_{5+}$ hydrocarbons, comprises a) a fraction (9, 11, 14) containing heavy hydrocarbons is admixed to the hydrocarbon-rich gas stream (1) to be liquefied, b) this mixed fraction (1, 2) is supplied to a separator (D), c) a gas fraction (3) freed of aromatic and heavy hydrocarbons is withdrawn from separator (D) and liquefied (E2), and d) a liquid fraction (5) enriched with aromatic and heavy hydrocarbons is withdrawn from separator (D).

20 Claims, 3 Drawing Sheets

METHOD FOR THE LIQUEFACTION OF A HYDROCARBON-RICH GAS STREAM CONTAINING AROMATIC AND HEAVY HYDROCARBONS

FIELD OF THE INVENTION

The invention is directed to a method for the liquefaction of a hydrocarbon-rich gas stream containing aromatic and heavy hydrocarbons, in particular a natural gas stream, where, prior to the liquefaction, the aromatic and the heavy hydrocarbons, in particular the $C_{5+}$ hydrocarbons are separated.

BACKGROUND OF THE INVENTION

Prior to the liquefaction of a hydrocarbon-rich gas stream, those components which freeze-out during the liquefaction process and therefore lead to an alteration of the process must be removed, on principle, from the gas stream to be liquefied. In particular the component benzene must be standardised to contents of <1 ppm in the liquefied hydrocarbon-rich stream.

The separation of these undesirable components, namely the aromatic and the heavy hydrocarbons, can, on principle, be undertaken in two different ways. In the event that the hydrocarbon-rich gas stream to be liquefied has a comparatively high proportion of heavy hydrocarbons, it is, prior to the actual liquefaction process, fractionated into one fraction consisting of heavy and aromatic hydrocarbons, and another fraction consisting of lighter hydrocarbons. Subsequently only the fraction consisting of lighter hydrocarbons is subjected to liquefaction. This method however has the disadvantage that it is firstly too expensive and secondly requires an independent process unit, i.e. with its own cooling and heating cycles.

In the event that the hydrocarbon-rich gas stream has lower proportions of aromatic and heavy hydrocarbons, it is recommended that separation of the heavy and the aromatic hydrocarbons be by way of adsorption. To achieve this, the adsorber or adsorbers used for the requisite drying and, if required, removal of carbon dioxide from the hydrocarbon-rich gas stream are dimensioned to be correspondingly larger or, in addition, equipped with suitable adsorbents which are capable of adsorbing the aromatic and the heavy hydrocarbons from the gas stream to be liquefied. A disadvantage of this method is however that, on the one hand, the adsorber or adsorbers used would have to be dimensioned larger and, on the other hand, that the gas recovered during the regeneration of the charged adsorbers is loaded, to a large extent, with heavy and aromatic hydrocarbons.

SUMMARY OF THE INVENTION

It is the object of the present invention to provide a method of the kind identified at the outset which avoids the disadvantages mentioned with regard to the processes representing the state of the art.

The method in accordance with the invention provides the following solution:

a) a fraction containing heavy hydrocarbons is admixed to the hydrocarbon-rich gas stream to be liquefied;

b) this mixed fraction is supplied to a separator;

c) a gas fraction freed of aromatic and heavy hydrocarbons is withdrawn from the separator and liquefied; and d) a liquid fraction enriched with aromatic and heavy hydrocarbons is withdrawn from the separator.

Contrary to the known state of the art processes, in accordance with the invention, a fraction containing heavy hydrocarbons is admixed to the hydrocarbon-rich gas stream to be liquefied. This fraction, admixed to the hydrocarbon-rich gas stream, washes the heavy hydrocarbons out of the hydrocarbon-rich gas stream to be liquefied.

In accordance with the invention, the mixed fraction—that is the total stream comprising the hydrocarbon-rich gas stream to be liquefied and the fraction containing heavy hydrocarbons—is supplied to a separator, where the separation of the heavy and the aromatic hydrocarbons from the hydrocarbon-rich gas stream to be liquefied is performed. At the head of the separator, a gas fraction freed of aromatic and heavy hydrocarbons is then withdrawn and can subsequently be liquefied without there being the risk of freezing-out. At the sump of the separator, on the other hand, a liquid fraction enriched with aromatic and heavy hydrocarbons is withdrawn.

Developing this process further, it is proposed that a) the liquid fraction enriched with aromatic and heavy hydrocarbons, which has been withdrawn from the separator, is supplied to a separation column; and b) the fraction supplied to the separation column is separated into a $C_{5-}$ hydrocarbon-rich gas fraction and a liquid fraction containing heavy hydrocarbons;

c) whereby the $C_{5-}$ hydrocarbon-rich gas fraction is admixed, as a absorption fraction to the hydrocarbon-rich gas stream to be liquefied, and the liquid fraction containing aromatic and heavy hydrocarbons is withdrawn.

This further development of the method in accordance with the invention thus proposes that the fraction containing heavy hydrocarbons, which is admixed as a absorption fraction to the hydrocarbon-rich gas stream to be liquefied, is extracted from the liquid fraction which is enriched with aromatic and heavy hydrocarbons and which is withdrawn from the sump of the separator. The latter fraction is initially supplied to a separation column, so that in the separation column it is separated into a $C_{5-}$ hydrocarbon-rich gas fraction and into a liquid fraction containing aromatic and heavy hydrocarbons.

Whilst the $C_{5-}$ hydrocarbon-rich gas fraction, as already mentioned, is admixed to the hydrocarbon-rich gas stream to be liquefied, the liquid fraction containing aromatic and heavy hydrocarbons is withdrawn and discharged as an unstabilised liquid (gasoline) from the process cycle, making available an additional product that is easy to handle and, if desired, can be used for other purposes, for instance combustion.

This embodiment of the method in accordance with the invention allows for the scrubbing liquid, required for the absorbing of the aromatic and the heavy hydrocarbons, to be produced from the hydrocarbon-rich gas stream, which is to be liquefied, itself. The provision of an "external" absorption liquid is therefore not required, which, in comparison with a large number of absorption processes allows for considerable cost savings to be achieved.

BRIEF DESCRIPTION OF THE DRAWINGS

The method in accordance with the invention as well as further embodiments of the same are explained in detail by reference to FIGS. 1 to 3 which are schematic flowsheets thereof.

DETAILED DESCRIPTION OF DRAWINGS

Figure 1:
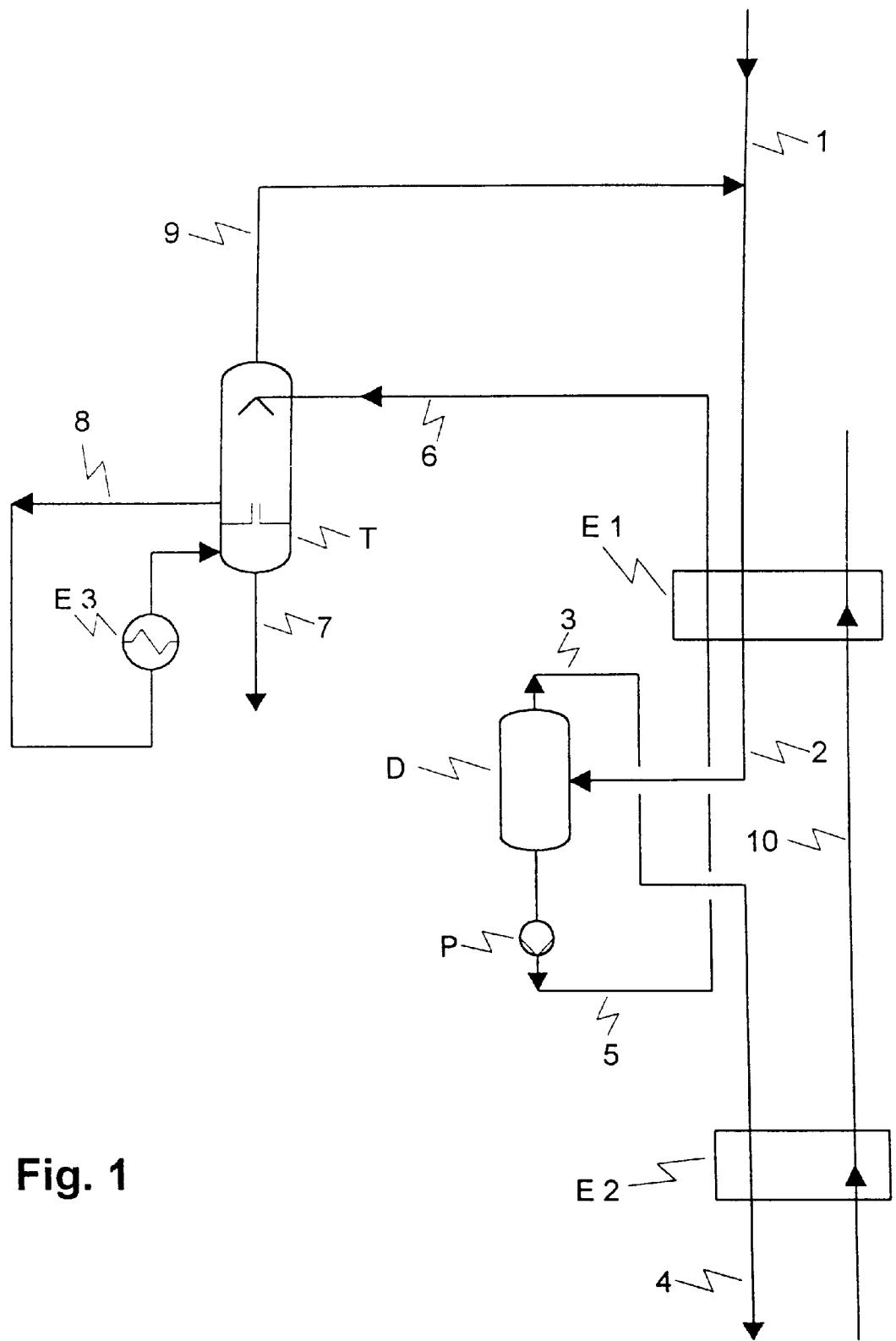

As FIG. 1 shows, the hydrocarbon-rich gas stream containing aromatic and heavy hydrocarbons is supplied to a first heat exchanger E1 via line 1. A (liquid) fraction, containing heavy hydrocarbons and which serves as a absorption liquid for the aromatic and the heavy hydrocarbons, is admixed via line 9 to the gas stream to be liquefied. This absorption fraction consists, depending on the particular design of the liquefaction process, essentially of $C_{5+}$ hydrocarbons or, in accordance with a further embodiment of the method according to the invention, of hydrocarbons higher than $C_5$ hydrocarbons.

The mixed fraction cooled in the heat exchanger E1 is subsequently supplied to separator D via line 2. At the head of separator D, a gas fraction freed of aromatic and heavy hydrocarbons is withdrawn via line 3 and supplied to a second heat exchanger E2. The refrigeration required in the heat exchangers E1 and E2 for the cooling or liquefaction of the hydrocarbon-rich gas stream is provided by a separate refrigeration cycle—this has merely been outlined as line 10 for the sake of easy viewing. This refrigeration cycle can naturally be any of the refrigeration cycles known to the expert, such as a mixed refrigerant cycle, an expansion cycle etc.

The gas fraction freed of aromatic and heavy hydrocarbons and withdrawn from the head of the separator via line 3 and supplied to the second heat exchanger E2, is, as already mentioned, cooled in the heat exchanger E2 and liquefied. After its liquefaction, it is supplied via line 4 to a receiver for storage pending any subsequent use.

From the sump of separator D, a liquid fraction enriched with aromatic and heavy hydrocarbons is withdrawn via line 5. By means of the pump P this is brought to a pressure which takes into account the pressure losses of heat exchanger E1 and separation column T and enables the supply of the absorption fraction withdrawn at the head of separation column T—without it being necessary to increase its pressure by means of a compressor—via line 9 to the hydrocarbon-rich gas fraction to be liquefied in line 1.

In accordance with a further advantageous embodiment of the method in accordance with the invention, the liquid fraction, enriched with aromatic and heavy hydrocarbons, is withdrawn from the sump of separator D via line 5 and supplied to heat exchanger E1 and there, in counterflow to the hydrocarbon-rich gas stream to be liquefied, is warmed and partially evaporated. Subsequently, the fraction which is enriched with aromatic and heavy hydrocarbons is supplied via line 6 to the head of the separation column T.

The separation column T has a boiler E 3 with a supply line 8, with which the $C_{5-}$ hydrocarbon concentration in the sump product is standardised. From the sump of separation column T, a liquid fraction containing aromatic and heavy hydrocarbons is withdrawn via line 7. This unstabilised liquid, as already mentioned, can be discharged from the process cycle as an additional product which is easy to handle. The $C_{5+}$ hydrocarbon-rich gas fraction withdrawn from the head of separation column T via line 9, in accordance with the invention, is admixed as absorption liquid to the hydrocarbon-rich gas stream to be liquefied in line 1.

As has also already been mentioned, in accordance with a further embodiment of the method according to the invention, the fraction serving as absorption liquid can consist essentially of $C_{6+}$ hydrocarbons. In this case, the separation sections in the separator D or separation column T must be selected accordingly.

Figure 2:
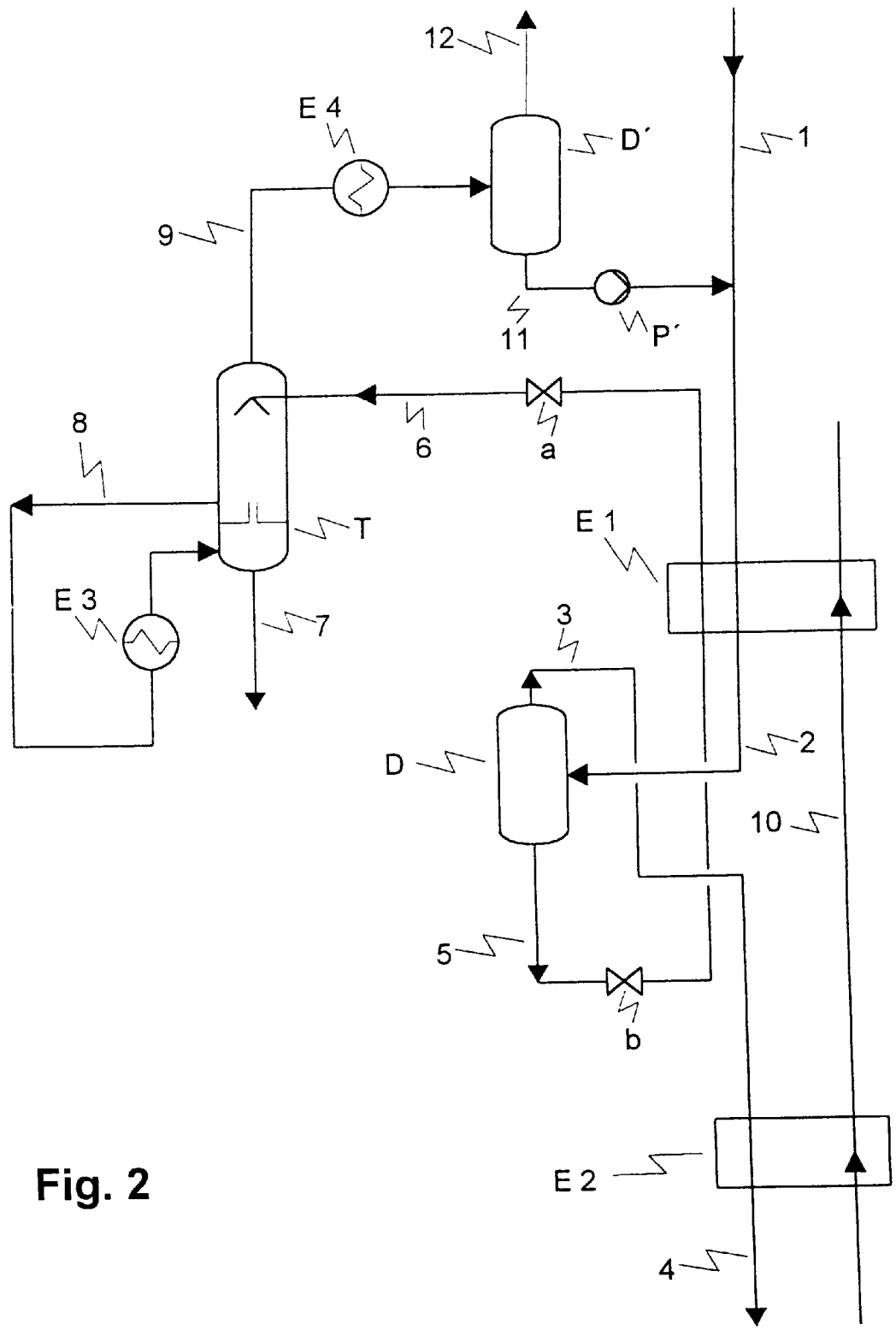
Figure 3:
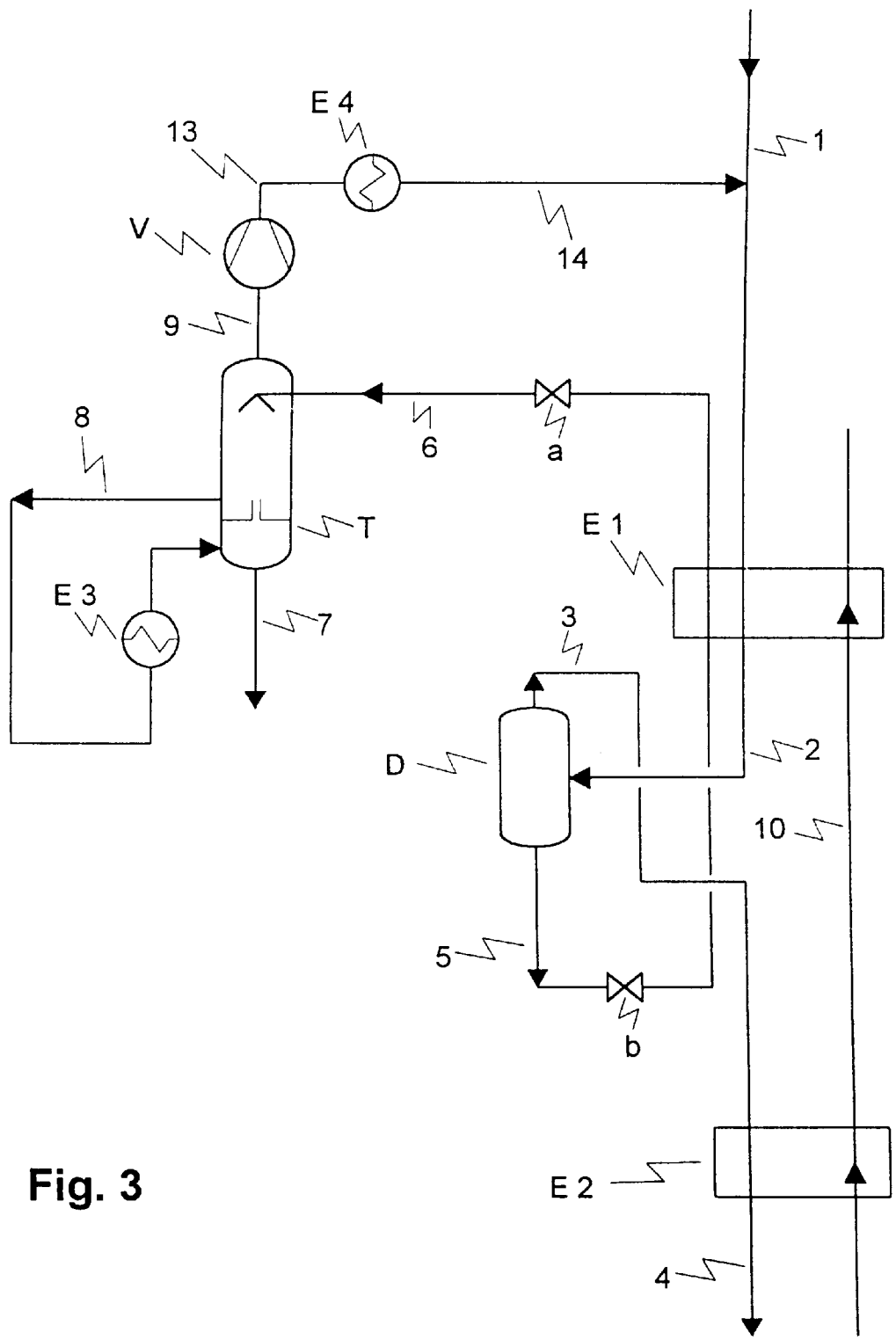

FIGS. 2 and 3 show largely identical methods for the liquefaction of a hydrocarbon-rich gas stream containing aromatic and heavy hydrocarbons, so that hereinafter, only the differences in the methods shall be discussed.

The $C_{5-}$ hydrocarbon-rich gas fraction, shown in FIG. 2, which is withdrawn from the head of separation column T via line 9, is supplied via a heat exchanger E4 where it is cooled and partially condensed, to a second separator D'. At the head of this separator D', a gas fraction containing essentially $C_1$–$C_3$ hydrocarbons is withdrawn via line 12 and will be supplied to subsequent uses, if required.

From the sump of this second separator D', a liquid fraction containing essentially $C_4$–$C_5$ hydrocarbons is withdrawn via line 11. This liquid fraction is pumped by means of pump P' to a pressure which enables the admixture of this fraction, which serves as a wash liquid, to the hydrocarbon-rich gas stream to be liquefied in line 1.

With this method, pump P, shown in FIG. 1, located in line 5 leading from the sump of separator D, is substituted by Pump P' in line 11 leading from the sump of separator D'.

The throttling valves a and b may be required in such processes, in order to prevent the loss of solid matter when expanding to the column pressure.

FIG. 3 shows a method where the separation, as shown in FIG. 2, of the fraction containing $C_1$–$C_3$ hydrocarbons is avoided. In this case, however, instead of a separator D', a comparatively more expensive compressor V must be provided. The gas fraction withdrawn from the head of separation column T via line 9, prior to its supply to the hydrocarbon-rich gas stream to be liquefied, is compressed in compressor V and subsequently, via line 13, supplied to a heat exchanger E4 and there cooled. Then it is supplied via line 14 to the hydrocarbon-rich gas stream to be liquefied.

Which of the methods shown in FIGS. 1 to 3 is considered, depends on the expert's choice which, in turn, is determined by given parameters, such as pressure and composition etc. of the hydrocarbon-rich gas stream to be liquefied.

In addition to the methods shown in FIGS. 1 to 3, naturally, further embodiments of the method in accordance with the invention, which make use of the essence of the invention, can be put into effect by the expert.

The method in accordance with the invention for the liquefaction of a gas stream containing aromatic and heavy hydrocarbons, in particular a natural gas stream as well as its embodiments, enable a reduction of the investment and operating costs, without achieving a significant increase of the specific liquefaction performance.

Contrary to the method described at the outset, namely that of a separate, independent separation of the aromatic and the heavy hydrocarbons prior to the actual cooling and liquefaction process, the invention proposes a simplified process. Furthermore, due to the method in accordance with the invention, the quality of the recovered gas, which is withdrawn from the adsorber or the adsorbers preceding the liquefaction process, does not suffer. For clearer viewing, the adsorption processes for pre-cleaning and drying have not been shown in FIGS. 1 to 3.

The method in accordance with the invention, nonetheless, ensures a complete separation of the components critical for the liquefaction process. Herein the separation process for the aromatic and the heavy hydrocarbons is integrated into the actual liquefaction process, that is the so-called "cold part", so that the separation of these components can be achieved without an additional, independent process unit.

Referring again to FIG. 1, the cooling of the gas feed mixed with the $C_5$ gas fraction (9) in heat exchanger E1 serves to partially liquefy the mixture resulting in an extraction of aromatic and heavy hydrocarbons from the feed. The introduced $C_5$ gas fraction serves to improve the extraction which occurs after or concurrently with the partial liquefaction.

Separator (D) is a phase separator and can be an inexpensive empty vessel (a knockout drum) or it can contain packing or plates to improve the separation. Separation column T, on the other hand, is generally a rectification column.

It is further to be noted that the terms "wash", "absorption" and "extraction" are used interchangeably in the specification and claims.

The preceding examples can be repeated with similar success by substituting the generically or specifically described reactants and/or operating conditions of this invention for those used in the preceding examples.

The entire disclosure of all applications, patents and publications, cited above, and of corresponding German application No. 196 22 692.9, are hereby incorporated by reference.

From the foregoing description, one skilled in the art can easily ascertain the essential characteristics of this invention, and without departing from the spirit and scope thereof can make various changes and modifications of the invention to adapt it to various usages and conditions.

We claim:

1. A process for the liquefaction of a hydrocarbon-rich gas stream containing aromatic and heavy hydrocarbons containing $C_{5+}$ hydrocarbons, comprising
   a) admixing a fraction (9, 11, 14) containing said heavy hydrocarbons to the hydrocarbon-rich gas stream (1) to be liquefied;
   b) passing the resultant mixed fraction (1, 2) to a separator (D) to separate gas and liquid fractions;
   c) withdrawing a gas fraction (3) freed of aromatic and heavy hydrocarbons from the separator (D) and liquefying said gas fraction; and
   d) withdrawing a liquid fraction (5) enriched with aromatic and heavy hydrocarbons from separator (D).

2. A process, in accordance with claim 1, for the liquefaction of a hydrocarbon-rich gas stream containing aromatic and heavy hydrocarbons, further comprising
   a) passing the liquid fraction (5), enriched with aromatic and heavy hydrocarbons, withdrawn from separator (D) to a separation column (T);
   b) separating the fraction supplied to the separation column (T) into a $C_{5-}$ hydrocarbon-rich gas fraction (9) and a liquid fraction (7) containing aromatic and heavy hydrocarbons; and
   c) admixing components of the $C_{5-}$ hydrocarbon-rich gas fraction (9) to the hydrocarbon-rich gas stream (1) to be liquefied, and withdrawing the liquid fraction (7) containing aromatic and heavy hydrocarbons.

3. A process in accordance with claim 2, for the liquefaction of a hydrocarbon-rich gas stream containing aromatic and heavy hydrocarbons, further comprising compressing and condensing the $C_{5-}$ hydrocarbon-rich gas fraction (9) withdrawn from the separation column (T), and admixing the resultant condensate as a scrubbing fraction (14) to the hydrocarbon-rich gas stream (1) to be liquefied.

4. A process in accordance with claim 3, for the liquefaction of a hydrocarbon-rich gas stream containing aromatic and heavy hydrocarbons, further comprising compressing and condensing the $C_{5-}$ hydrocarbon-rich gas fraction (9) withdrawn from the separation column (T), and admixing the resultant condensate as a scrubbing fraction (14) to the hydrocarbon-rich gas stream (1) to be liquefied.

5. A process in accordance with claim 3, for the liquefaction of a hydrocarbon-rich gas stream containing aromatic and heavy hydrocarbons, further comprising prior to said compressing and condensing, separating $C_{1-3}$ lighter hydrocarbons from the $C_{5-}$ hydrocarbon-rich gas fraction (9) withdrawn from the separation column (T).

6. A process in accordance with claim 5, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

7. A process in accordance with claim 6, for the liquefaction of a hydrocarbon-rich gas stream containing aromatic and heavy hydrocarbons, wherein said heating and partial evaporation (E1) of the liquid fraction (5) enriched with aromatic and heavy hydrocarbons is conducted through indirect heat exchange with the hydrocarbon-rich gas stream (1) to be liquefied.

8. A process in accordance with claim 3, for the liquefaction of a hydrocarbon-rich gas stream containing aromatic and heavy hydrocarbons, further comprising prior to said compressing and condensing, separating $C_{1-3}$ lighter hydrocarbons from the $C_{5-}$ hydrocarbon-rich gas fraction (9) withdrawn from the separation column (T).

9. A process in accordance with claim 8, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

10. A process in accordance with claim 2, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

11. A process in accordance with claim 10, for the liquefaction of a hydrocarbon-rich gas stream containing aromatic and heavy hydrocarbons, wherein said heating and partial evaporation (E1) of the liquid fraction (5) enriched with aromatic and heavy hydrocarbons is conducted through indirect heat exchange with the hydrocarbon-rich gas stream (1) to be liquefied.

12. A process in accordance with claim 2, for the liquefaction of a hydrocarbon-rich gas stream containing aromatic and heavy hydrocarbons wherein the fraction (9, 11, 14), which is admixed to the hydrocarbon-rich gas stream (1) to be liquefied, contains higher than $C_5$ hydrocarbons.

13. A process in accordance with claim 12, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

14. A process in accordance with claim 1, for the liquefaction of a hydrocarbon-rich gas stream containing aromatic and heavy hydrocarbons wherein the fraction (9, 11, 14), which is admixed to the hydrocarbon-rich gas stream (1) to be liquefied, contains hydrocarbons, higher than $C_5$.

15. A process in accordance with claim 14, for the liquefaction of a hydrocarbon-rich gas stream containing aromatic and heavy hydrocarbons, further comprising compressing and condensing the $C_{5-}$ hydrocarbon-rich gas fraction (9) withdrawn from the separation column (T), and admixing the resultant condensate as a scrubbing fraction (14) to the hydrocarbon-rich gas stream (1) to be liquefied.

16. A process in accordance with claim 15, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

17. A process in accordance with claim 14, for the liquefaction of a hydrocarbon-rich gas stream containing aromatic and heavy hydrocarbons, further comprising prior to said compressing and condensing, separating $C_{1-3}$ lighter hydrocarbons from the $C_{5-}$ hydrocarbon-rich gas fraction (9) withdrawn from the separation column (T).

18. A process in accordance with claim 17, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

19. A process in accordance with claim 18, for the liquefaction of a hydrocarbon-rich gas stream containing aromatic and heavy hydrocarbons, wherein said heating and partial evaporation (E1) of the liquid fraction (5) enriched with aromatic and heavy hydrocarbons is conducted through indirect heat exchange with the hydrocarbon-rich gas stream (1) to be liquefied.

20. A process in accordance with claim 14, for the liquefaction of a hydrocarbon-rich gas stream containing aromatic and heavy hydrocarbons, further comprising heating and partially evaporating the liquid fraction (5) enriched with aromatic and heavy hydrocarbons prior to said passing to the separation column (T).

* * * * *